(12) United States Patent
Shimizu et al.

(10) Patent No.: US 8,170,399 B2
(45) Date of Patent: May 1, 2012

(54) RECORDING DEVICE AND METHOD

(75) Inventors: Yukitaka Shimizu, Narashino (JP); Akio Ichikawa, Chiba (JP); Shinjiro Kihara, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1427 days.

(21) Appl. No.: 11/663,333

(22) PCT Filed: Sep. 27, 2005

(86) PCT No.: PCT/JP2005/017761
§ 371 (c)(1),
(2), (4) Date: Mar. 21, 2007

(87) PCT Pub. No.: WO2006/035777
PCT Pub. Date: Apr. 6, 2006

(65) Prior Publication Data
US 2008/0101766 A1    May 1, 2008

(30) Foreign Application Priority Data

Sep. 29, 2004   (JP) .................................. 2004-284301

(51) Int. Cl.
*H04N 5/92* (2006.01)
(52) U.S. Cl. ........................................ 386/326; 386/239
(58) Field of Classification Search .................. None
See application file for complete search history.

(56) References Cited

U.S. PATENT DOCUMENTS

| 5,987,126 | A | 11/1999 | Okuyama et al. |
| 6,584,552 | B1 | 6/2003 | Kuno et al. |
| 7,130,525 | B1 | 10/2006 | Iwano |
| 7,226,202 | B2 * | 6/2007 | Chen et al. ............. 362/649 |

| 2004/0052502 | A1 | 3/2004 | Komatsu et al. |

(Continued)

FOREIGN PATENT DOCUMENTS

CN    1361985 A    7/2002

(Continued)

OTHER PUBLICATIONS

Association of Radio Industries and Businesses (ARIB), "Operational Guidelines for BS/Broadband CS Digital Broadcasting", ARIB TR-B15, Ver. 2.9, vol. 8, Feb. 2004.

(Continued)

*Primary Examiner* — William C Vaughn, Jr.
*Assistant Examiner* — Asher Khan
(74) *Attorney, Agent, or Firm* — Birch, Stewart, Kolasch & Birch, LLP

(57) ABSTRACT

To enable a recording device recording a video/audio signal and information necessary for utilizing the video/audio signal to copy the video/audio signal with the converted bit rate, encoding format, etc., to another recording device when utilizing the video/audio signal by the another recording device, and to move only the information necessary for utilizing the video/audio signal between the recording device and the another recording device. A recording device comprises: an input portion that inputs a video/audio signal; a recording portion that records the video/audio signal and information necessary for utilizing the video/audio signal; and a converting portion that converts the recorded video/audio signal. The recording device, leaving the original video/audio signal, copies the video/audio signal whose bit rate, encoding format, etc., have been converted at the converting portion to another recording device and moves the information necessary for utilizing the video/audio signal to the another recording device. After the video/audio signal is utilized by the another recording device, only the information necessary for utilizing the video/audio signal is moved again from the another recording device to the recording device.

15 Claims, 15 Drawing Sheets

U.S. PATENT DOCUMENTS

| | | |
|---|---|---|
| 2004/0172549 A1* | 9/2004 | Kojima et al. .............. 713/193 |
| 2005/0105728 A1 | 5/2005 | Yamaoka et al. |
| 2005/0281540 A1 | 12/2005 | Inokuchi et al. |
| 2008/0072072 A1 | 3/2008 | Muraki et al. |

FOREIGN PATENT DOCUMENTS

| | | |
|---|---|---|
| CN | 1484832 A | 3/2004 |
| EP | 0 880 823 A1 | 8/1998 |
| EP | 1 045 388 A1 | 10/2000 |
| EP | 1 045 389 A1 | 10/2000 |
| JP | 2000-312339 A | 11/2000 |
| JP | 2001-100933 A | 4/2001 |
| JP | 2003-179852 A | 6/2003 |
| JP | 2003-224822 A | 8/2003 |
| JP | 2003-331528 A | 11/2003 |
| JP | 2004-62870 A | 2/2004 |
| JP | 2004-127470 A | 4/2004 |
| JP | 2005-267619 A | 9/2005 |
| JP | 2006-4543 A | 1/2006 |
| WO | WO 2005/122165 A1 | 12/2005 |

OTHER PUBLICATIONS

Digital Transmission Content Protection Specification, vol. 1 (Informational Version), Revision 1.4, Feb. 28, 2005, pp. 1-81.

* cited by examiner

|  | MOVE SOURCE | MOVE DESTINATION |
|---|---|---|
| ENCRYPTED TITLE KEY | Kma·Kt1 | NONE |
| ENCRYPTED DATA | Kt1·C | NONE |

(B)

|  | MOVE SOURCE | MOVE DESTINATION |
|---|---|---|
| ENCRYPTED TITLE KEY | Kmb·(Kma·Kt3) | Kmb·Kt2 |
| ENCRYPTED DATA | Kt3·C | Kt2·C' |

(C)

|  | MOVE SOURCE | MOVE DESTINATION |
|---|---|---|
| ENCRYPTED TITLE KEY | Kma·Kt3 | NONE |
| ENCRYPTED DATA | Kt3·C | NONE |

(D)

|  | MOVE SOURCE | MOVE DESTINATION |
|---|---|---|
| ENCRYPTED TITLE KEY | Kma·Kt3 | Kma(Kmb·Kt4) |
| ENCRYPTED DATA | Kt3·C | Kt4·C' |

RECORDING DEVICE AND METHOD

TECHNICAL FIELD

The present invention relates to a recording device and method and, more particularly, to a device for recording a stream including copy control information, such as digital transmission, and relates to a device that can transfer a stream recorded on the recording medium to another recording medium and a method thereof.

BACKGROUND OF THE INVENTION

Copy control information has been added to digital data to protect copyright of the digital data. For example, in the case of the DTCP (Digital Transmission Content Protection, see, e.g., Non-Patent Document 1), the copy control information is recorded as two-bit information in the CCI (Copy Control Information) transmitted concurrently with the stream or in the EMI (Encryption Mode Indicator) included in a packet header. The two-bit information specifies the following four types of the copy control. That is, the four types are Copy-free (copying is permitted without constrained condition), No-more-copies (recopying is prohibited), Copy-one-generation (copying is permitted only for one generation), and Copy never (copying is prohibited).

A stream specified to Copy-free can be recorded. A stream specified to Copy-one-generation can also be recorded by changing copy control information of the stream to No-more-copies. A stream specified to No-more-copies or Copy never cannot be recorded.

The BS digital broadcasting/CS digital broadcasting is operated in the same way (see, e.g., Non-Patent Document 2). The CCI or EMI corresponds to the digital recording control data included in the digital copy control descriptor transmitted concurrently with the stream. The digital recording control data are two-bit data and the value thereof specifies "copying is permitted without constrained condition", "copying is permitted only for one generation", and "copying is prohibited". A pattern corresponding to "recopying is prohibited" is not prescribed in the broadcasts and such a case is construed as "copying is prohibited".

For example, in the case of the CPRM (Content Protection for Removable Media), copyright of digital data are protected using the MKB (Media Key Block) and media ID recorded in an unwritable area of a recording medium, and device keys recorded in a recording device and a reproducing device.

FIG. 13 is a diagram for explaining a conventional technology relating to copyright protection of digital data. In FIG. 13, the MKB and media ID are recorded in an unwritable area of a recording medium. Both recording device and reproducing device secretly hold a device key. First, a process at the time of recording will be described. At (A), the recording device generates a media key from the device key and the MKB. At (B), the recording device generates a media unique key from the media key and the media ID. At (C), using the media unique key, the recording device encrypts a randomly generated title key. The encrypted title key is recorded on the recording medium. At (D), the recording device generates a key from the title key and the CCI. The CCI is not encrypted and is directly recorded on the recording medium. At (E), using the key generated at (D), the recording device encrypts data. The encrypted data are recorded in the recording medium.

A process at the time of reproducing will be described. At (A'), the reproducing device generates the media key from the device key and the MKB. At (B'), the reproducing device generates the media unique key from the media key and the media ID. At (C'), the reproducing device decrypts the encrypted title key read from the recording medium with the media unique key to acquire the title key. At (D'), the reproducing device generates a key from the title key and the CCI on the recording medium. At (E'), using the key generated at (D'), the reproducing device decrypts the encrypted data on the recording medium. Since the device key is secret, only a legitimate reproducing device can utilize the data. Although the encrypted title key and the CCI are recorded in the readable/writable area and can be changed, if one or both of the encrypted title and the CCI are illegally rewritten, the key acquired at (D') becomes unauthorized and the encrypted data becomes unavailable.

On the other hand, along with development of portable terminals, the video data are increasingly recorded in a portable terminal and utilized outside. In this situation, the data once recorded in the recording device are dubbed into a portable terminal.

In Patent Document 1, a video/audio data recording/reproducing method and a disk device using the method are provided which enables a recorded moving image to be watched on a television and on a portable terminal easily by dubbing the same moving image onto a memory card, as follows.

That is, a disk medium records a first video/audio file that is made by compressing and converting a video/audio signal into a first video/audio format and a second video/audio file that is made by compressing and converting the video/audio signal into a second video/audio format different from the first video/audio format, and the disk medium records correlation information that can manage the first video/audio file and the second video/audio file as one content.

FIG. 14 is a block diagram of a configuration example of a conventional video recorder, and a video recorder 100 houses an HDD (hard disk drive) 109 that records video/audio files. The video recorder 100 includes a TV tuner 101 that is a video/audio signal receiving means receiving a TV signal input externally, an MPEG2 encoder 102 that is a first signal converting means converting the video/audio signal output from the TV tuner 101 into a format complying with the MPEG2 standard, an MPEG4 encoder 103 that is a second signal converting means converting the video/audio signal output from the TV tuner 101 into a format complying with the MPEG4 standard, and an HDD control circuit 104 that is a disk medium recording means recording the video/audio file into the HDD 109 after the conversion by the above two encoders.

The video recorder 100 includes an MPEG2 decoder 105 that converts (decompresses) the MPEG2 data recorded in the HDD 109 into a signal reproducible in a graphics circuit 108, a memory card control circuit 106 that can record/reproduce data into/from a memory card, and a CPU 107 that controls the blocks of the video recorder 100.

Non-Patent Document 1: Digital Transmission Content Protection Specification Volume 1 (Informational Version)

Non-Patent Document 2: ARIB (Association of Radio Industries and Businesses) ed., "Operational Guidelines for BS/Broadband CS Digital Satellite Broadcasting, Document No. ARIB TR-B15", version 2.9, eighth edition, February 2004.

Patent Document 1: Japanese Laid-Open Patent Publication No. 2003-179852

DISCLOSURE OF THE INVENTION

Problems to be Solved by the Invention

However, a conventional method does not give consideration to the video/audio signal prohibited from being copied due to the copy control information, etc. If the video/audio signal recorded in the recording device is utilized by a portable terminal, etc., the signal is transferred (hereinafter, "moved") after converting the bit rate, the encoding format, etc., in accordance with the portable terminal, as described in the Patent Document 1. This is because the video/audio signals have a high bit rate and the signals for a short time can only be moved to a limited recording area of the portable terminal or memory card in the case of the unmodified bit rate. For example, since the bit rate of the Hi-Vision broadcast stream of the BS digital broadcasting is up to on the order of 24 Mbps, even a 512-Mbyte memory card can record the stream only for on the order of 512 Mbyte/24 Mbps≈171 seconds in the case of the unmodified bit rate. A large recording amount increases power consumption at the time of read/write and therefore is not appropriate for portable terminals.

If the video recorder utilizes the video/audio signal again after the signal is once moved from the video recorder to the portable terminal or memory card, the video/audio signal is needed to be moved again from the portable terminal or memory card to the video recorder since the original video/audio signal is erased in the video recorder at the time of the move. However, since the bit rate, the encoding format, etc., are converted at the time of the move to portable terminal or memory card, it is problematic that the quality of the video/audio signal is deteriorated.

FIG. 15 is a diagram for explaining a process flow when a conventional recording device moves data to another recording device. In FIG. 15(A), the recording device records data (hereinafter, data C) that can be copied only for one generation. At this point, recopying is prohibited for the data C. In FIG. 15(B), the data is dubbed into another recording device with the bit rate reduced. Since recopying is prohibited, at the time of the dubbing, the data is moved and the original data is erased after the copying. Therefore, as shown in FIG. 15(C), the data C is erased from the original recording device. Another recording device records deteriorated data C' with the bit rate reduced. The data C' is data for which recopying is prohibited. In FIG. 15(D), the data C' is moved to the original recording device. The original recording device records the deteriorated data C'. Since recopying of the data C' is prohibited, the data C' is erased from another recording device. As briefly described above, even if the data is repeatedly moved and returned to the original recording device, the data are deteriorated because the bit rate is reduced.

In the BS digital broadcasting/CS digital broadcasting, the method described in Patent Document 1 cannot be used since generation of a plurality of copies is prohibited (see non-patent document 1) when "copying is permitted only for one generation". In the case of another video/audio signal, even if a plurality of copies can be generated when "copying is permitted only for one generation", the above problem relating to the move is generated unless a plurality of copies are generated at the time of the initial recording. The same problem occurs in the video/audio data initially recorded as "copy-prohibit" or "recopy-prohibit" data.

The present invention is conceived in view of the above situations and it is therefore the object of the present invention to enable a recording device recording a video/audio signal and information necessary for utilizing the video/audio signal to copy the video/audio signal with the converted bit rate and encoding format to another recording device when utilizing the video/audio signal by another recording device, leaving the original video/audio signal, and to move only the information necessary for utilizing the video/audio signal between the recording device and another recording device.

Means for Solving the Problems

To solve the above problems, a first technical means of the present invention is a recording device comprising: an input means that inputs a video/audio signal; a recording means that records a video/audio signal and information necessary for utilizing the video/audio signal; and a converting means that converts a video/audio signal, the device copying the video/audio signal recorded in the recording means to another recording device while converting with the converting means, the device moving the information necessary for utilizing the video/audio signal to the another recording device.

A second technical means is a recording device comprising: an input means that inputs a video/audio signal; a recording means that records a video/audio signal and information necessary for utilizing the video/audio signal; and a converting means that converts the video/audio signal, when the video/audio signal from the input means is recorded in the recording means, the device converting the video/audio signal with the converting means, the device recording and retaining the video/audio signal after the conversion and the video/audio signal before the conversion in the recording means, the device copying the converted video/audio signal to another recording device, the device moving the information necessary for utilizing the video/audio signal to the another recording device.

A third technical means is the recording device of the first or second technical means, wherein the input means includes a means for receiving transmission data with a copy control signal overlapped.

A fourth technical means is the recording device of the first or second technical means, wherein the input means includes a means for detachably mounting a recording medium that records a video/audio signal and information necessary for utilizing the video/audio signal to perform read/write from/into the recording medium.

A fifth technical means is the recording device of any one of the first to fourth technical means, comprising an encrypting means that encrypts the video/audio signal from the input means and records it in the recording means, wherein the information necessary for utilizing the video/audio signal is license information that includes information necessary for decrypting the encrypted video/audio signal and usage control information relating to the video/audio signal.

A sixth technical means is the recording device of any one of the first to fourth technical means, comprising an encrypting means that encrypts the video/audio signal from the input means and records it in the recording means, wherein the information necessary for utilizing the video/audio signal includes at least one of an encrypted decryption key generated by encrypting a decryption key of the encrypted video/audio signal and usage control information relating to the video/audio signal.

A seventh technical means is the recording device of any one of the first to sixth technical means, wherein the another recording device is a detachable recording medium and wherein the recording device includes a means for attaching/detaching the another recording device.

An eighth technical means is the recording device of any one of the first to seventh technical means, wherein the recording device and the another recording device can record reproduction start position information of the video/audio signal and wherein when copying the video/audio signal to the another recording device, the recording device also copies the reproduction start position information.

A ninth technical means is the recording device of any one of the first to eighth technical means, wherein the recording means can record a conversion condition at the time of copying to the another recording device.

A tenth technical means is a recording method of recording a video/audio signal from a recording device to another recording device, the method comprising the steps of: inputting a video/audio signal; recording the input video/audio signal and information necessary for utilizing the video/audio signal; copying the recorded video/audio signal to the another recording device while converting; and moving the information necessary for utilizing the video/audio signal to the another recording device.

An eleventh technical means is a recording method of recording a video/audio signal from a recording device to another recording device, the method comprising the steps of: inputting a video/audio signal; recording the input video/audio signal and information necessary for utilizing the video/audio signal; converting the input video/audio signal; recording the converted video/audio signal; copying the converted video/audio signal to the another recording device; and moving the information necessary for utilizing the video/audio signal to the another recording device.

Effect of the Invention

According to the present invention, since a recording device recording a video/audio signal and information necessary for utilizing the video/audio signal can copy the video/audio signal with the converted bit rate, encoding format, etc., to another recording device when utilizing the video/audio signal by another recording device, leaving the original video/audio signal, and can move only the information necessary for utilizing the video/audio signal between the recording device and another recording device, the video/audio signal can be utilized without deterioration by moving the information necessary for utilizing the video/audio signal again from another recording device to the original recording device after the video/audio signal is utilized by another recording device.

BRIEF DESCRIPTION OF THE DRAWINGS

FIG. 8 is a diagram of examples of the encrypted title key and the encrypted data in another embodiment of the present invention.

Figure 1:
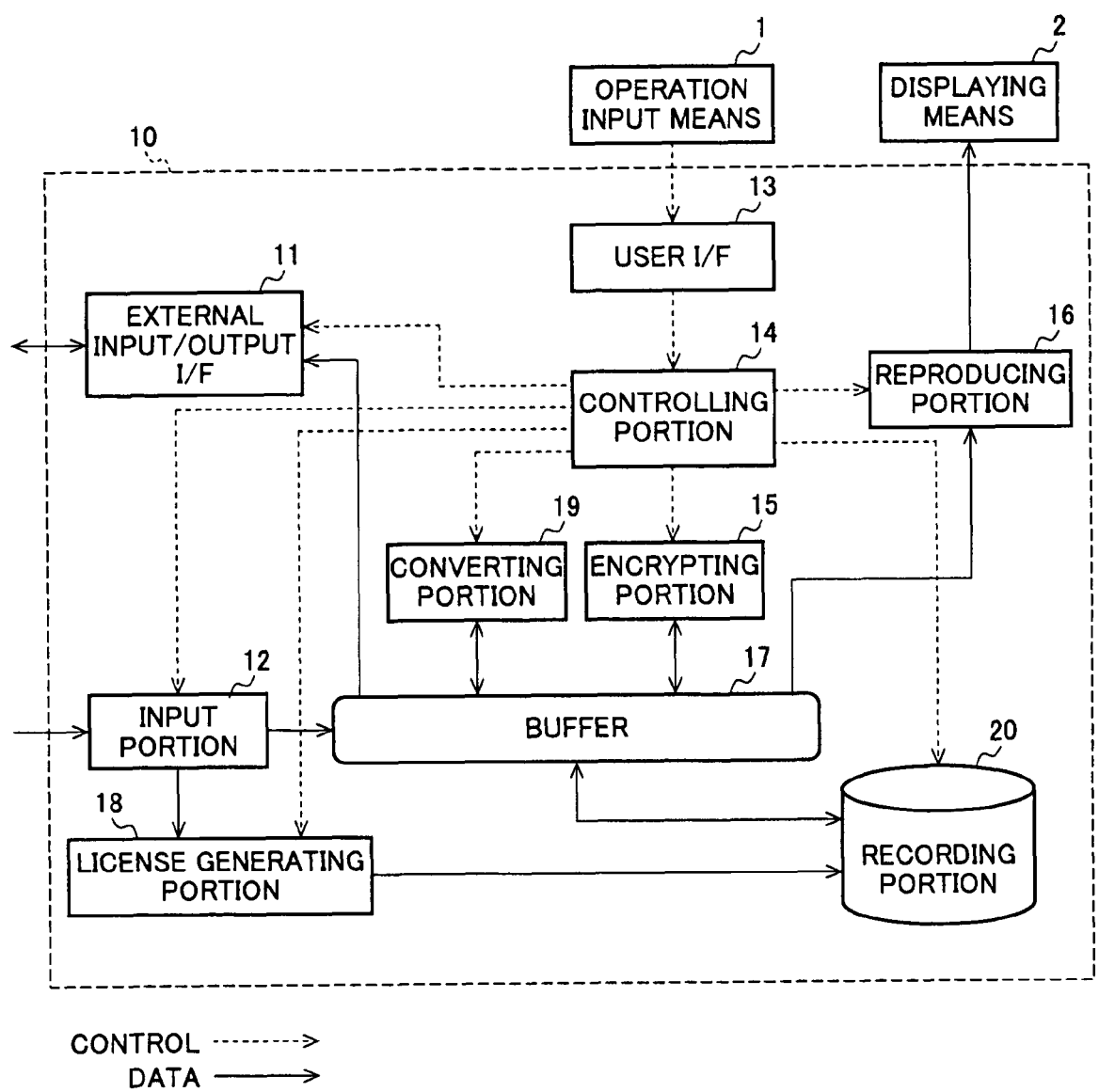
FIG. 1 is a block diagram of a basic configuration example of a recording device according to one embodiment of the present invention.

EXPLANATION OF REFERENCE NUMERALS 1, 5 . . . operation input means; 2, 6 . . . displaying means; 3 . . . normal area; 4 . . . secure area; 10 . . . recording device; 11, 31 . . . external input/output I/F; 12 . . . input portion; 13, 32 . . . user I/F; 14, 33 . . . controlling portion; 15, 34 . . . encrypting portion; 16, 35 . . . reproducing portion; 17, 36 . . . buffer; 18 . . . license generating portion; 19 . . . converting portion; 20, 37 . . . recording portion; 30 . . . another recording device; 100 . . . video recorder; 101 . . . TV tuner; 102 . . . MPEG2 encoder; 103 . . . MPEG4 encoder; 104 . . . HDD controlling circuit; 105 . . . MPEG2 decoder; 106 . . . memory card controlling circuit; 107 . . . CPU; 108 . . . graphics circuit; and 109 . . . hard disk (HDD).

PREFERRED EMBODIMENTS OF THE INVENTION

In one embodiment of the present invention, a recording medium preferably includes a normal area and a secure area. The secure area is disposed on the TRM (Tamper Resistant Module) area of the recording medium. A special procedure is needed for read/write from/in the secure area, and users and applications cannot freely refer to/change the area. Users and applications can freely refer to/change the normal area.

In this description, license is information mainly including information necessary for utilizing content (mainly video/audio signals), the use condition of the content, etc., and the information necessary for utilizing content corresponds to the encryption key of the content for decrypting the content, which is encrypted in the encoding mode/encrypting mode/common key mode of the content, for example. The use condition of the content corresponds to, other than the above copy control information, information of the number of reproducible times/number of transferable (movable) times/number of duplicatable (copiable) times/usable period/age limit for viewing, for example.

The iVDR (information Versatile Disk for Removable usage) is considered as the hard disk with the secure area. The iVDR is a removable recording medium and can record the encrypted content in the normal area and the license in the secure area. A procedure of recording and reproducing video into/from the recording medium is the same as that of existing hard disk recorders, etc. Memory cards such as the secure MMC (MultiMediaCard) can also be used as the recoding medium with the secure area.

In another embodiment, the content may be encrypted using a title key and utilization control information and the recording medium may record the title key that is encrypted (encrypted title key), the utilization control information, and the encrypted content. Such a recording mode capable of recording the encrypted title key, the copy control information, and the encrypted content includes the CPRM, which is described in a conventional technology. In the CPRM, major differences from the embodiment using the license are that the encrypted title key and the CCI corresponding to the utilization control information are recorded in a rewritable area and that the information necessary for encrypting the title key is recorded in an unrewritable area.

First Embodiment

FIG. 1 is a block diagram of a basic configuration example of a recording device according to one embodiment of the present invention; 10 is a recording device in FIG. 1; and the recording device 10 includes an external input/output interface (I/F) 11 for connecting another recording device (hereinafter, often referred to as another recording medium), an input portion 12 for inputting a video/audio signal as content, a user I/F 13 that inputs an operation signal from an operation input means 1, a controlling portion 14 that includes a CPU, memory, etc., for controlling the recording device 10, an encrypting portion 15 that encrypts/decrypts the video/audio signal, a reproducing portion 16 that reproduces the video/audio signal, a buffer 17 that temporarily holds the video/audio signal, a license generating portion 18 that generates a license from the video/audio signal from the input portion 12, etc., a converting portion 19 that converts the video/audio signal, and a recording portion 20 that records the video/audio signal and the license. The operation input means 1 and the displaying means 2 are disposed to be integrally or externally connected to the recording device 10. In FIG. 1, dot-line arrows indicate a flow of a control signal and solid-line arrows indicate a flow of a data signal.

Each portion will be described in more detail. The external input/output I/F 11 is an interface for connecting the recording device 10 to the another recording device not shown. The external input/output I/F 11 includes a connector for the IEEE 1394, USB (Universal Serial Bus), etc., or includes a detachable mechanism for a removable recording medium and an interface for data read/write if the another recording medium is a removable recording medium. The input portion 12 is a means for inputting the video/audio signal and may be an input means such as a tuner that receives digital transmission signals or analogue transmission signals, or an input means such as the IEEE 1394 interface, for example.

The user I/F 13 is a portion that selects the operation of the recording device 10, such as tuning in the digital transmission, recording/reproducing operation. The controlling portion 14 is a portion that controls each constituent element based on the input from the user I/F 13. The encrypting portion 15 is a portion that encrypts/decrypts the video/audio signal. The reproducing portion 16 is a portion that reproduces the video/audio signal. The buffer 17 is a buffer for temporarily storing data for reception/reproduction/conversion. The operation input means 1 is a means with which a user operates the recording device 10. The displaying means 2 is used for displaying the video/audio signal and OSD (On Screen Display) created by the user I/F 13. The license generating portion 18 extracts the utilization control information overlapping the video/audio signal input from the input portion 12 to create the license.

The converting portion 19 converts the bit rate, encoding format, etc., of the video/audio signal. In the conversion of the encoding format, for example, the video/audio signal encoded in the MPEG2 is converted to the video/audio signal encoded in the MPEG4, or the audio data in the PCM (Pulse Code Modulation) format is converted to the audio data in the MP3 (MPEG Audio Layer-3) format. The recording portion 20 of the embodiment retains the normal area and the secure area, and the encrypted video/audio signal and the license are recorded into the normal area and the secure area, respectively.

In this embodiment, for example, a removable recording medium is used as the another recording medium. Although, for example, the ATA (AT Attachment) interface is used as an interface of reading/writing data from/into the another recording device in the external input/output I/F 11 in this embodiment, interfaces such as the USB (Universal Serial Bus) and IEEE 1394 may be used. In this embodiment, the input portion 12 is a receiving means for digital transmission signals. The reading/writing of data from/into the another recording medium and the input portion 12 for the digital transmission signal are the same as a conventional digital transmission receiving apparatus with a built-in hard disk.

The encrypting portion 15, as described later, encrypts/decrypts the video/audio signal with the common key encryption. With regard to the common key encryption used here, the triple DES (Data Encryption Standard), the AES (Advanced Encryption Standard), etc., are available. The reproducing portion 16 is a decoder that decodes the video/audio signal.

The operation input means 1 is, for example, an operation remote controller or buttons disposed on the recording device 10. The displaying means 2 is a liquid crystal display, plasma display, and EL display, for example. The removable recording medium is a removable hard disk, for example.

Figure 2:
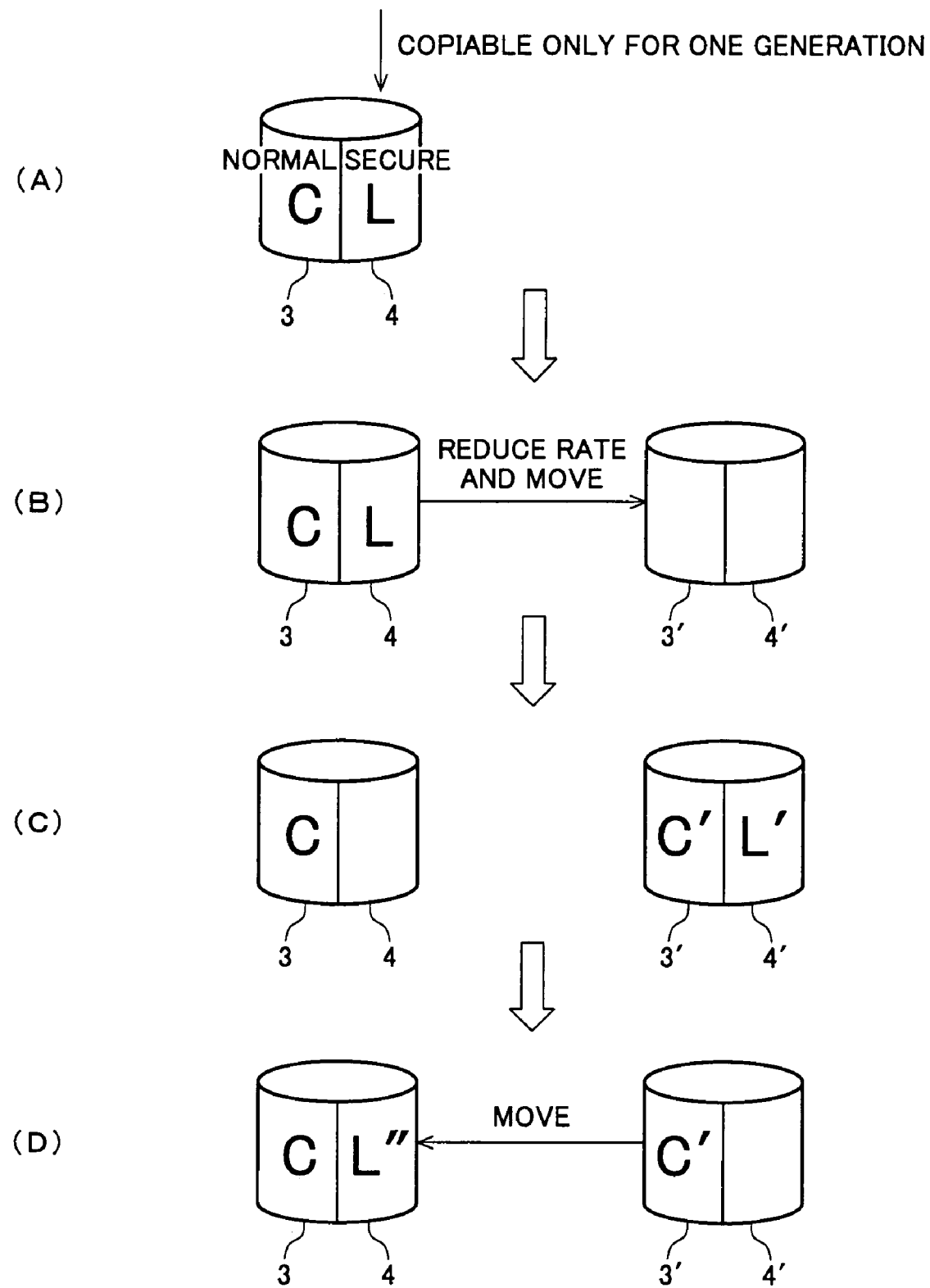
FIG. 2 is a diagram for explaining an example of a flow of a video/audio signal and license in a first embodiment of the present invention.

FIG. 2 is a diagram for explaining an example of a flow of the video/audio signal and license in a first embodiment of the present invention; in FIG. 2, 3 is a normal area of a recording medium; 4 is a secure area of the recording medium; 3' is a normal area of another recording medium; and 4' is a secure area of the another recording medium. In FIG. 2(A), a video/audio signal copiable only for one generation is recorded on the recording medium. In this case, a video/audio signal C is recorded in the normal area 3 of the recording medium. A license L is recorded in the secure area 4. Since recopying is prohibited for the video/audio signal C, the number of reproducible times recorded in the license L is zero and the number of transferable times is unrestraint.

In FIG. 2(B), the bit rate and encoding format of the video/audio signal is converted and the converted video/audio signal is copied to the another recording medium, and the license is moved. Although the description of FIG. 2(B) is "reduce rate and move" for simplicity, the operation in the present invention practically indicates the copying of the video/audio signal after the conversion and the move of the license. The video/audio signal after the conversion will be described as a video/audio signal C'. Since the license L may be changed in accordance with the change in the video/audio signal, the license data after the change will be described as a license L'. The content changed in the license is the content of the encoding format, bit rate, etc. Although the encryption key in the license is changed if the encryption key of the video/audio signal is changed, it is preferable that the encryption key is not changed in consideration of returning it to the original recording medium. However, if the encryption key is changed, the encryption key of the video/audio signal C is also recorded in the license L' in consideration of returning it to the original recording medium.

FIG. 2(C) shows results of the conversion and copying of the video/audio signal and the move of the license to the another recording medium. Only the video/audio signal C is left on the original recording medium and the license L is erased. Therefore, the video/audio signal cannot be utilized in the original recording medium. The another recording medium is recorded with the video/audio signal C' and the license L', and the video/audio signal C' after the conversion can be utilized. In FIG. 2(D), the license L' is moved from the another recording medium to the original recording medium. Since only the video/audio signal C' is recorded on the another recording medium and the license L' is erased, the video/audio signal C' cannot be utilized. If the utilization of the video/audio signal C' is not expected to be utilized in the another recording medium, the video/audio signal C' may be erased.

The originally recorded video/audio signal C and a moved license L" are recorded on the original recording medium. Since the license L" has been moved through the another recording medium, the use condition (e.g., number of transferable times) may be changed. Since the original recording medium has the video/audio signal C and the corresponding license L", the video/audio signal C can be utilized. For the correlation between the video/audio signal and the license, a content ID is added to the video/audio signal; a license ID is added to the license; the video/audio signal records the corresponding content ID; and the license records the corresponding content ID. If the license is changed from L to L' and L" as in FIG. 2, the changed contents are recorded for restoration to the state before change.

Figure 3:
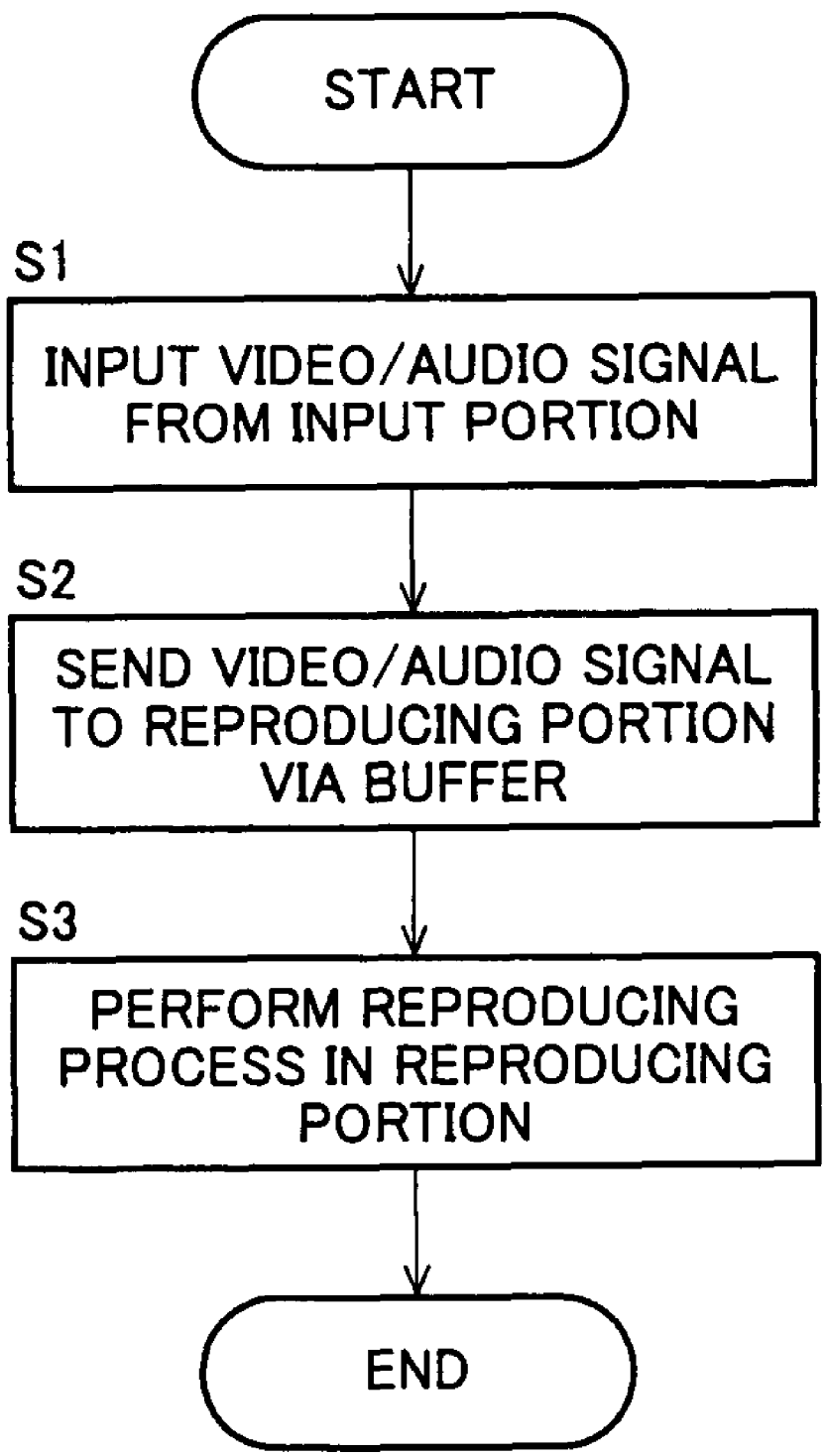
FIG. 3 is a flow diagram for explaining an example of a process procedure of the recording device according to the first embodiment of the present invention.

FIG. 3 is a flow diagram for explaining an example of a process procedure of the recording medium 10 according to the first embodiment of the present invention. This example describes a normal viewing state without recording.

The recording medium 10 inputs the video/audio signal from the input portion 12 (step S1). This video/audio signal is TS (Transport Stream) or PS (Program Stream) acquired by tuning in the digital transmission. Although not shown in this flow, the selected channel has been selected by a user in advance through the operation input means 1 via the user I/F 13. The controlling portion 14 inputs information of the channel to be selected from the user I/F 13 to the input portion 12, and the input portion 12 performs the selection operation based on the information.

The recording device 10 temporarily accumulates the video/audio signal from the input portion 12 into the buffer 17 and the reproducing portion 16 inputs the video/audio signal of the buffer 17 (step S2). Finally, the reproducing portion 16 performs the decoding process of the video/audio signal to output a video signal to the displaying means 2 (step S3).

Figure 4:
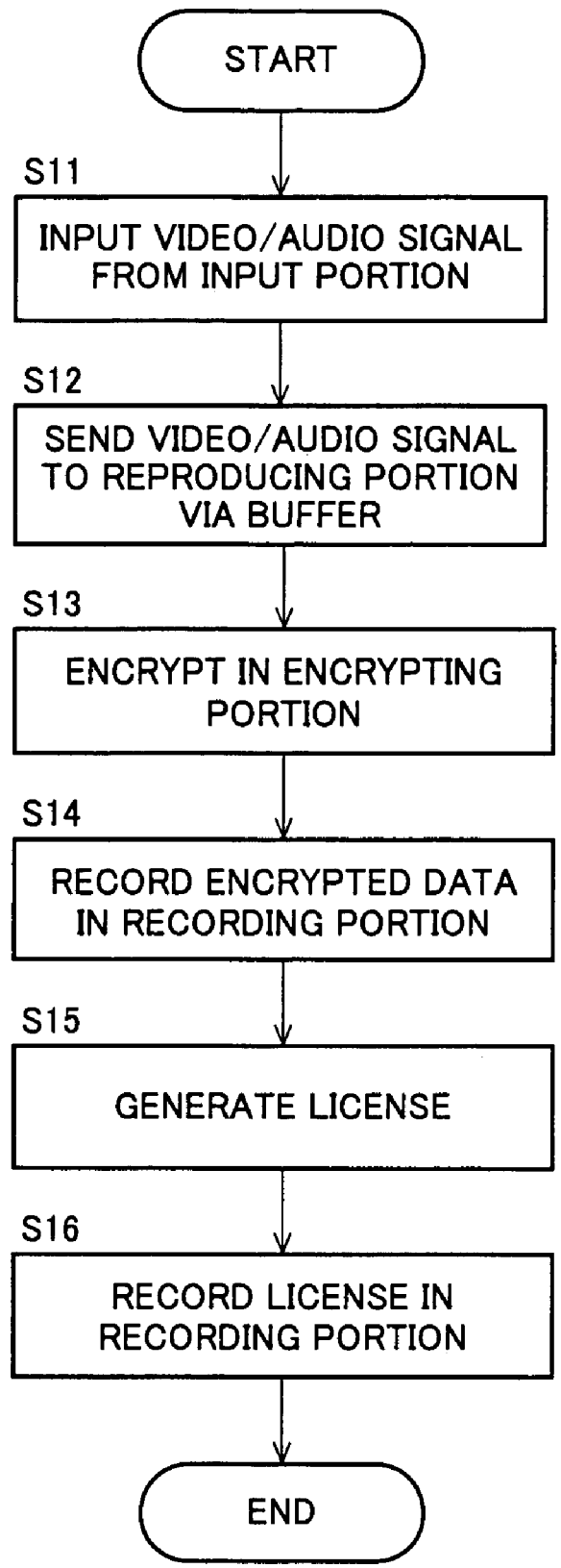
FIG. 4 is a flow diagram for explaining another example of the process procedure of the recording device according to the first embodiment of the present invention.

FIG. 4 is a flow diagram for explaining another example of the process procedure of the recording device 10 according to the first embodiment of the present invention. This example describes a method of recording the video/audio signal with usage restriction due to the copy control information into the recording portion 20. Although not shown in the flow of FIG. 4, the input portion 12 extracts the digital copy control descriptor overlapping the video/audio signal, and the copy control information of the video/audio signal, which is being received, is input to the license generating portion 18.

The video/audio signal is input from the input portion 12 (step S11). This process is the same process as step S1 shown in FIG. 3. The video/audio signal from the input portion 12 is temporarily accumulated in the buffer 17 (step S12). The controlling portion 14 generates an encryption key Kc for encrypting the video/audio signal. The encryption key Kc is a key of the common key encryption, which is generated for each video/audio signal. The generated encryption key Kc is set in the encrypting portion 15. The encrypting portion 15 encrypts the video/audio signal in the buffer 17 with the encryption key Kc (step S13). The recording device 10 records the encrypted video/audio signal into the recording portion 20 via the buffer 17 (step S14). After the video/audio signal is recorded, the license generating portion 18 generates a license from the copy control information and the encryption key Kc (step S15), and the license is recorded in the recording portion 20. In combination with the procedure described in FIG. 3, the video/audio signal can be viewed while recording by inputting the video/audio signal before encryption from the buffer 17 to the reproducing portion 16.

Figure 5:
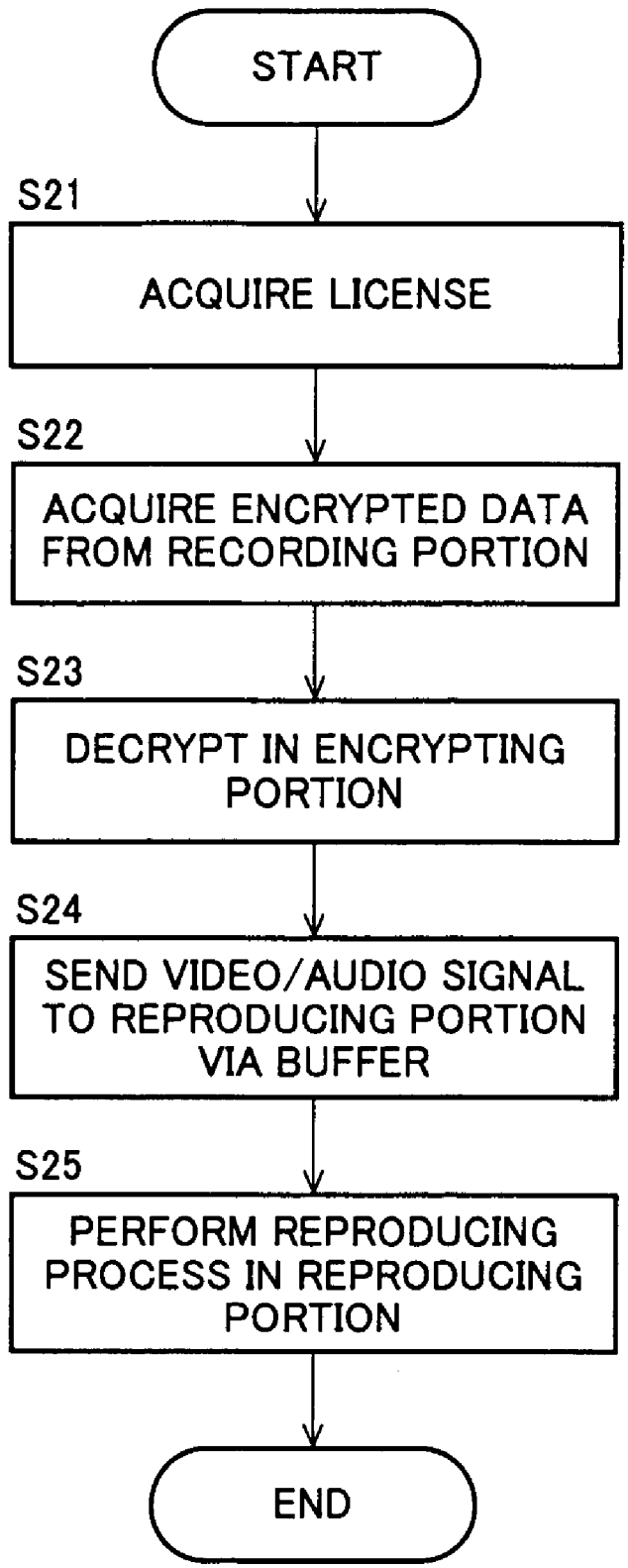
FIG. 5 is a flow diagram for explaining another example of the process procedure of the recording device according to the first embodiment of the present invention.

FIG. 5 is a flow diagram for explaining another example of the process procedure of the recording device 10 according to the first embodiment of the present invention. This example describes a method of reproducing the recorded and encrypted video/audio signal. The recording device 10 acquires the license (step S21). The recording device 10 acquires the encrypted video/audio signal recorded in the recording portion 20 via the buffer 17 (step S22). The encrypting portion 15 performs the decrypting process with the encryption key Kc included in the license and writes the decryption result into the buffer 17 (step S23). The decrypted video/audio signal in the buffer 17 is sent to the reproducing portion 16 (step S24) and the reproducing portion 16 performs the decoding process to output the video signal to the displaying means 2 (step S25).

Figure 6:
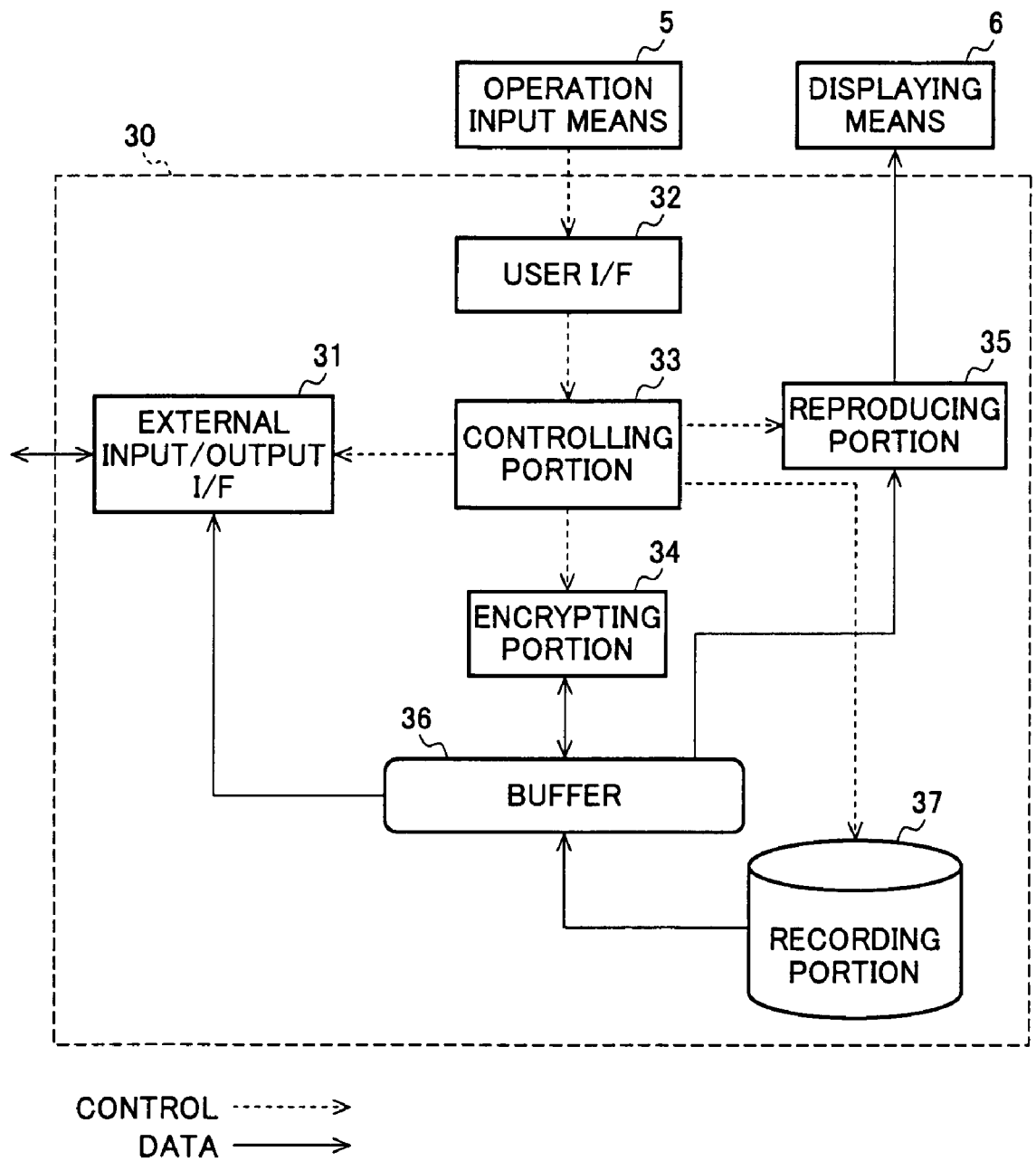
FIG. 6 is a block diagram of a basic configuration example of another recording device according to the first embodiment of the present invention.

FIG. 6 is a block diagram of a basic configuration example of another recording device according to the first embodiment of the present invention; 30 is another recording device in FIG. 6; and the another recording device 30 includes an external input/output interface (I/F) 31 for connecting the recording device 10, a user I/F 32 that inputs an operation signal from an operation input means 5, a controlling portion 33 that includes a CPU, memory, etc., for controlling the another recording device 30, an encrypting portion 34 that encrypts/decrypts the video/audio signal, a reproducing portion 35 that reproduces the video/audio signal, a buffer 36 that temporarily holds the video/audio signal, and a recording portion 37 that records the video/audio signal and the license. The operation input means 5 and the displaying means 6 are disposed to be integrally or externally connected to the another recording device 30. In FIG. 6, dot-line arrows indicate a flow of a control signal and solid-line arrows indicate a flow of a data signal.

Figure 7:
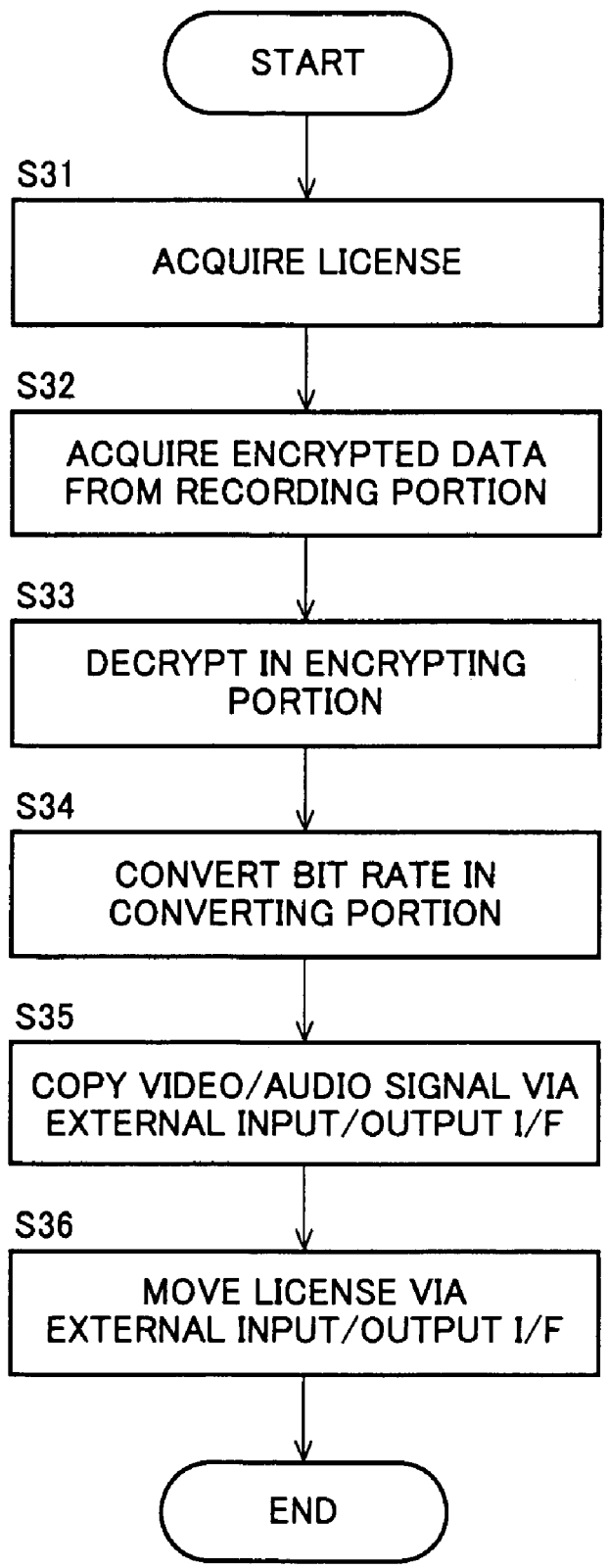
FIG. 7 is a flow diagram for explaining an example of the procedure when the video/audio signal is moved from the recording device to the another recording device.

FIG. 7 is a flow diagram for explaining an example of the procedure when the video/audio signal is moved from the recording device 10 to the another recording device 30. The recording device 10 acquires the license (step S31). The recording device 10 acquires the encrypted video/audio signal recorded in the recording portion 20 via the buffer 17 (step S32). The encrypting portion 15 performs the decrypting process with the encryption key Kc included in the license, and the recording device 10 writes the decryption result into the buffer 17 (step S33). The converting portion 19 converts the bit rate, encoding mode, etc., and writes the result into the buffer 17 (step S34). The video/audio signal after the conversion is copied to the another recording device 30 via the external input/output I/F 11 (step S35). After the copying of the video/audio signal is completed, the license is also moved to the another recording device 30 via the external input/output I/F 11 (step S36). The another recording device 30 inputs the video/audio signal and the license from the external input/output I/F 31 and records the video/audio signal and the license into the recording portion 37 via the buffer 36.

Step 36 will be described in detail. The license records the encryption key of the content for decrypting the content, which is encrypted in the encoding mode/encrypting mode/common key mode of the content, the copy control information/number of reproducible times/number of transferable (movable) times/number of duplicatable (copiable) times/usable period/age limit for viewing, etc. These pieces of information are changed appropriately at the time of the move of the license. For example, if the encoding mode is changed, the information of the encoding mode is rewritten. If the encryption key is changed, the information of the encryption key is rewritten. If the number of transferable (movable) times is restricted, the restriction is changed (if the number of movable times is five, the number is reduced to four, for example). If the encoding mode or the encryption key is changed, the encoding mode or encryption key before change is correlated with the license and recorded in the recording portion 37 for restoration. In this case, although the encoding mode may be stored in the normal area, the encoding mode is preferably stored in the secure area since the video/audio signal can improperly be utilized if the encryption key is stored in the normal area.

Although the converting portion 19 is disposed in the recording device 10 in this embodiment, the converting portion 19 may be disposed in the another recording device 30. In such a case, the another recording device 30 converts the bit rate, encoding format, etc.

A method of reproducing the video/audio signal in the another recording device 30 is equivalent to the procedure shown in FIG. 5.

Description will be made of a procedure of utilizing the video/audio signal in the recording device 10 after utilizing the video/audio signal in the another recording device 30. Since the original video/audio signal is recorded in the recording device 10, only the license needs to be moved. In the procedure thereof, only steps S31 and S36 shown in FIG. 7 need to be performed. At step S36, the encoding mode and the encryption key of the license are restored to the original state and if the number of transferable (movable) times is restricted, the number is changed before the move. By doing as above, the license can be moved to the recording device 10. In the recording device 10, the lossless video/audio signal can be utilized with the procedure shown in FIG. 5.

Although the recording device 10 and the another recording device 30 are connected through each external input/output I/F in this embodiment, a removable recording medium can be used as the another recording device 30. In this case, the external input/output I/F 11 shown in FIG. 1 acts as a detachable portion and a read/write I/F of the removable recording medium. In this case, the another recording device 30 is basically configured by the external input/output I/F 31 (for connecting with external input/output I/F 11), the controlling portion 33, and the buffer 36 shown in FIG. 6 and other constituent elements may not be included.

Although the above embodiment has been described using an example of realizing the usage restriction of the video/audio signal with the use of the license, another embodiment is possible. For example, the usage restriction is realized with the use of the CPRM, etc., as follows. At the time of the normal recording, the video/audio signal is encrypted using a title key and CCI and the recording medium is recorded with the encrypted title key, the CCI, and the encrypted video/audio signal, as described for the conventional technology.

At the time of the move, the recording into the move destination is performed with the same process as the normal move. That is, the video/audio signal is decrypted in the procedure described for the conventional technology, along with the conversion of the bit rate, encoding format, etc. A second title key is randomly generated; the CCI is changed as needed; and these are used to record the video/audio signal on the recording medium of the move destination in the procedure described for the conventional technology. That is, the recording medium of the move destination is recorded with the encrypted title key generated by encrypting the second title key with a media unique key of the move destination and the CCI after change.

In the embodiment using the CPRM, etc., major differences from the embodiment using the license are that the encrypted title key and the CCI corresponding to the utilization control information are recorded in a rewritable area and that the information necessary for encrypting the title key is recorded in an unrewritable area.

In this embodiment, the video/audio signal of the move source is not erased; a third title key is randomly generated; the CCI is changed as needed; and these are used to rerecord the video/audio signal on the recording medium of the move source in the procedure described for the conventional technology. If the encrypted title key is simply erased to make the video/audio signal unutilizable instead of using the third title key to rerecord the video/audio signal of the move source, the following problem occurs.

That is, since the encrypted title key is recorded in the area that can freely be read and written by users and applications, if the value is recorded before the move and is rerecorded after the move, the video/audio signal made unutilizable becomes utilizable.

Therefore, as described above, the video/audio signal of the move source is not erased; the third title key is randomly generated; the CCI is changed as needed; and these are used to rerecord the video/audio signal on the recording medium of the move source. If the CCI of the move source is changed, the CCI is rerecorded as is the case with the conventional technology. However, the recording medium of the move source does not record the encrypted title key generated by encrypting the third title key with a media unique key of the move source and instead records a title key generated by further encrypting the encrypted title key with the media unique key of the recording medium of the move destination, i.e., a double-encrypted title key. With the double-encrypted title key, the video/audio signal cannot be utilized as described for the conventional technology.

To utilize the video/audio signal of the move source, the double-encrypted title key is decrypted with the media unique key of the move destination to generate the encrypted title key, which is rerecorded on the recording medium of the move source. The same procedure as the conventional technology is then used to make the video/audio signal of the move source utilizable. In this case, the video/audio signal of the move destination is erased or another title key is generated and rerecorded as is the case with this embodiment.

FIG. 8 is a diagram of examples of the encrypted title key and the encrypted data in another embodiment of the present invention. Symbols of the FIGS. 8(A) to 8(D) are defined as follows.

Kma: media unique key of move source recording medium
Kmb: media unique key of move destination recording medium
Kt1: title key
Kt2: second title key
Kt3: third title key
Kt4: fourth title key
C: original video/audio signal
C': video/audio signal after the conversion In FIGS. 8(A) to 8(D), for example, Kma·Kt1 shown in FIG. 8(A) indicates that the move source is recorded with the data (the encrypted title key) generated by encrypting Kt1 (the title key) with Kma (the media unique key) and similarly, Kt1·C indicates that the move source is recorded with the data (the encrypted data) generated by encrypting C (the original video/audio signal) with Kt1 (the title key).

In the embodiment using the CPRM, etc., FIG. 8(A) shows the recording state of the encrypted title key and the encrypted data before the move. That is, the move source is recorded with the encrypted title key generated by encrypting Kt1 (the title key) with Kma (the media unique key) and the encrypted data generated by encrypting C (the original video/audio signal) with Kt1 (the title key), and the move destination has no data.

FIG. 8(B) shows the recording state of the encrypted title key and the encrypted data after the move. That is, the move destination is recorded with the encrypted title key generated by encrypting Kt2 (the second title key) with Kmb (the media unique key) and the encrypted data generated by encrypting C' (the video/audio signal after the conversion) with Kt2 (the second title key), and the move source is recorded with the encrypted title key generated by encrypting Kt3 (the third title key) with Kma (the media unique key of the move source) to generate an encrypted key and by further encrypting the encrypted key with Kmb (the media unique key of the move destination), and the encrypted data generated by encrypting C (the original video/audio signal) with Kt3 (the third title key). In this case, the video/audio signal C' after the conversion can be utilized in the move destination while the original video/audio signal C cannot be utilized in the move source.

FIGS. 8(C) and 8(D) also show the recording state of the encrypted title key and the encrypted data after the move. In FIG. 8(C), the move source is recorded with the encrypted title key generated by encrypting Kt3 (the third title key) with Kma (the media unique key) and the encrypted data generated by encrypting C (the original video/audio signal) with Kt3 (the third title key), and the data are erased from the move destination. In FIG. 8(D), the move destination is recorded with the encrypted title key generated by encrypting Kt4 (the fourth title key) with Kmb (the media unique key of the move destination) to generate an encrypted key and by further encrypting the encrypted key with Kma (the media unique key of the move source), and the encrypted data generated by encrypting C' (the video/audio signal after the conversion) with Kt4 the fourth title key), and the move source is recorded with the encrypted title key generated by encrypting Kt3 (the third title key) with Kma (the media unique key of the move source) and the encrypted data generated by encrypting C (the original video/audio signal) with Kt3 (the third title key) In either case, the data can only be utilized in the move source.

The video/audio signal can be utilized without deterioration of the signal as above even in the case of the move to the original device using the CPRM, etc. Although the encrypted title key is moved in this embodiment, the same effect can be achieved by moving the CCI or moving both the encrypted key and the CCI.

Second Embodiment

Description will be made of an embodiment of storing the video/audio signal with the bit rate, encoding format, etc., converted in advance, which is applicable to the case that the generation of a plurality of copies is permitted even when "copying is permitted only for one generation". A configuration of the recording device in this embodiment is the same as the recording device 10 shown in FIG. 1.

Figure 9:
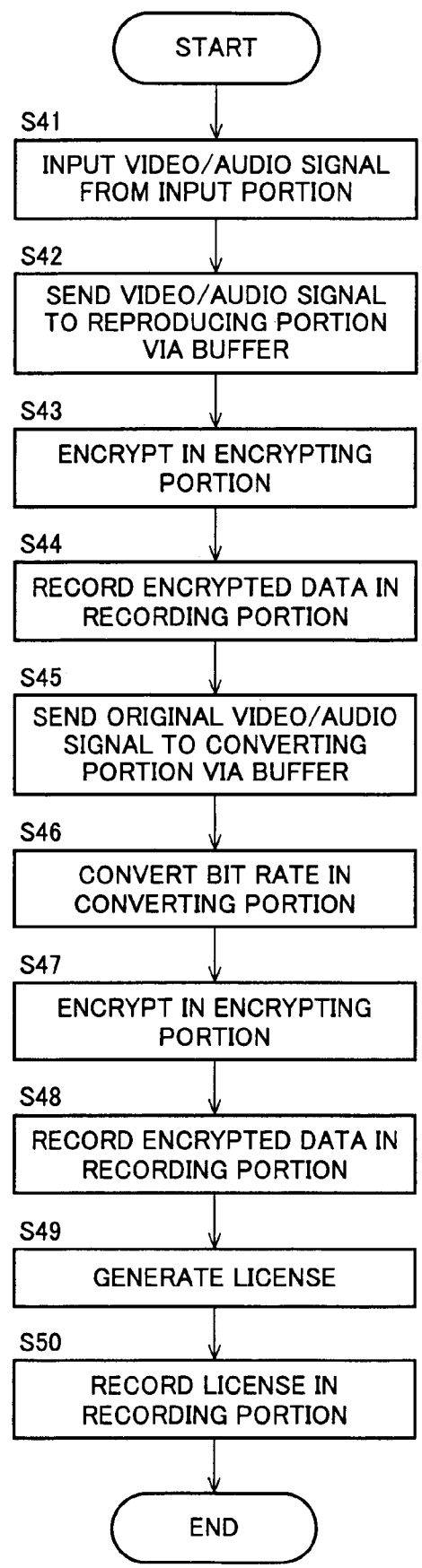
FIG. 9 is a flow diagram for explaining an example of the process procedure of the recording device according to a second embodiment of the present invention.

FIG. 9 is a flow diagram for explaining an example of the process procedure of the recording device 10 according to a second embodiment of the present invention. Steps S41 to S44 of the embodiment are the same as the Steps S11 to S14 shown in FIG. 4.

After the recording device 10 records the encrypted data generated by encrypting the original video/audio signal into the recording portion 20 at step S44, the recording device 10 inputs the original video/audio signal into the converting portion 19 via the buffer 17 (step S45). The converting portion 19 converts the bit rate, encoding mode, etc., and the conversion result is written into the buffer 17 (step S46). The conversion result is encrypted by the encrypting portion 15 (step S47). In the embodiment, the encryption is performed with the same encryption key as the case of non-conversion. The recording portion 20 records the encrypted data (step S48). The license generating portion 18 generates a license (step S49). In the embodiment, the same license is created for both of the video/audio signals before and after the conversion. The generated license is recorded in the recording portion 20 (step S50).

Figure 10:
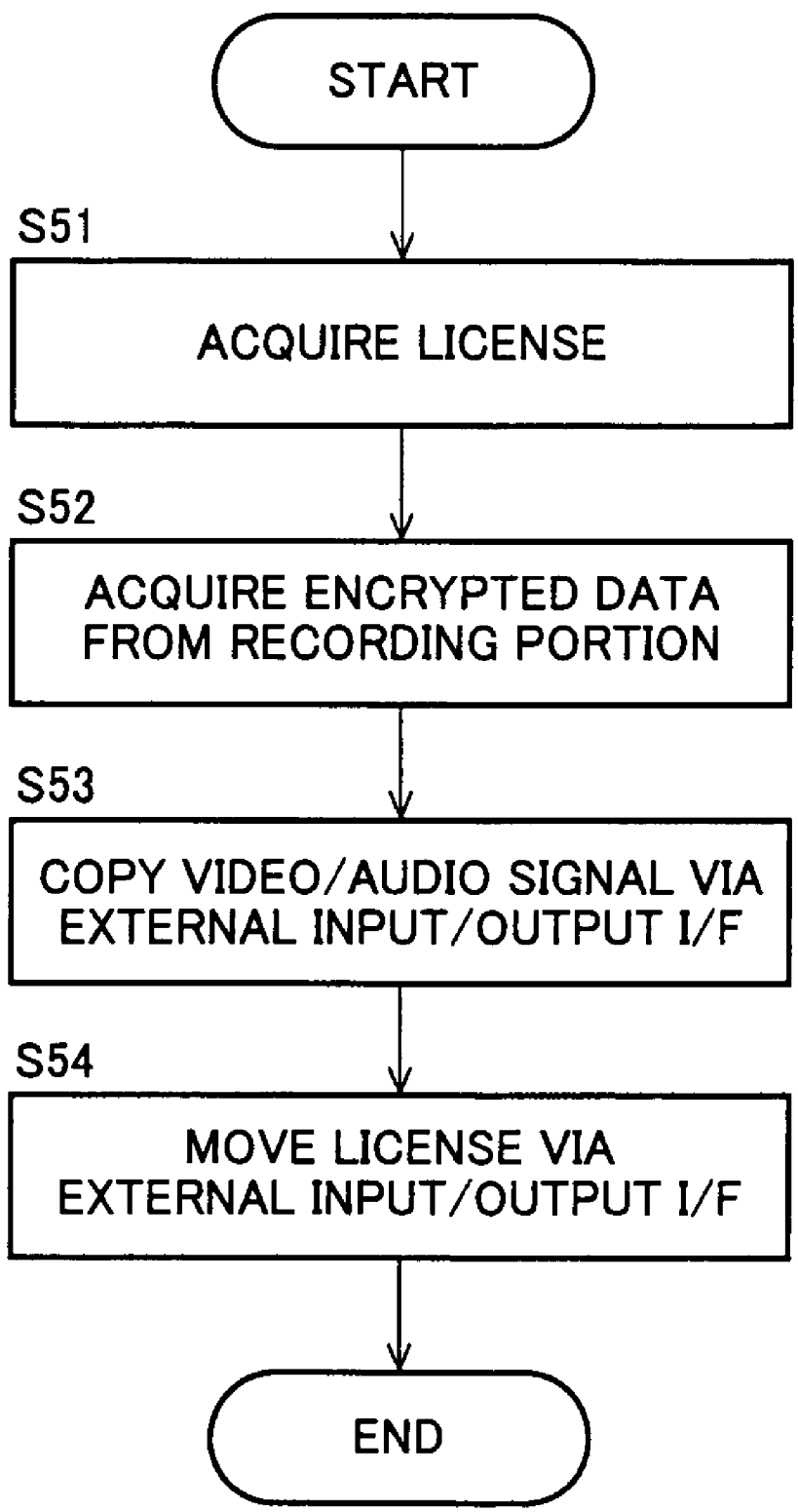
FIG. 10 is a flow diagram for explaining another example of the process procedure of the recording device according to the second embodiment of the present invention.

FIG. 10 is a flow diagram for explaining another example of the process procedure of the recording device 10 according to the second embodiment of the present invention. This example describes the move operation when the video/audio signals before and after the conversion are recorded in FIG. 9. The recording device 10 acquires the license (step S51). The recording device 10 acquires the encrypted video/audio signal recorded in the recording portion 20 via the buffer 17 (step S52). The video/audio signal after the conversion is copied to another recording device via the external input/output I/F 11 (step S53). After the copying of the video/audio signal is completed, the license is also moved to another recording device via the external input/output I/F 11 (step S54). Another recording device inputs the video/audio signal and the license from the external input/output I/F included in the device and records the video/audio signal and the license into the recording portion via the buffer.

Third Embodiment

Description will be made of an embodiment when the input portion is a removable recording medium instead of a transmission receiving portion. A basic configuration of this embodiment is the same as the recording device 10 shown in FIG. 1, except that the input portion 12 performs reading from the removable recording medium instead of the transmission receiving process.

In the case of a recording medium holding the license in the secure area, the removable recording medium operates in accordance with the usage restriction in the license. That is, if the number of duplicable times is equal to or greater than one, the video/audio data may be duplicated. If the number of duplicable times is zero and the move is permitted, the move operation is performed. The license generating portion 18 generates the license to be recorded into the recording portion 20 from the license recorded in the removable recording medium.

In the case of using the CPRM, etc., for the recording, the removable recording medium operates in accordance with the usage restriction. In this case, the license generating portion 18 also generates the license to be recorded into the recording portion 20.

Other Embodiments

In the above embodiments, the recording device and the another recording device may be capable of recording the reproduction start position information of the video/audio signal at the time of performing the move operation and the reproduction start position information may also be copied when copying the video/audio signal. For example, if a 30-minute video/audio signal is recorded in the recording device and is viewed to a 10-minute position, the reproduction start position is located at a position 10-minute away from the beginning, and if the move is performed in this situation, the reproduction start position information of the corresponding video/audio signal is set to a position 10-minute away from the beginning in the second recording device. Therefore, for example, if the recording device is fixed-type and the another recording device is portable-type, after viewing partway in the fixed recording device, the video/audio signal can be moved to the portable another recording device to view the rest.

It is needless to say that the reproduction start position information may also be copied at the time of the move from the another recording device to the original recording device. The conversion condition at the time of the move to the another recording device may be recorded in the recording device. As a result, a user does not have to select the conversion condition each time.

Although only one move is assumed in the above embodiments, the video/audio signal may sequentially be moved if three recording devices (recording mediums) exist, for example. This case will briefly be described using FIG. 11.

Figure 11:
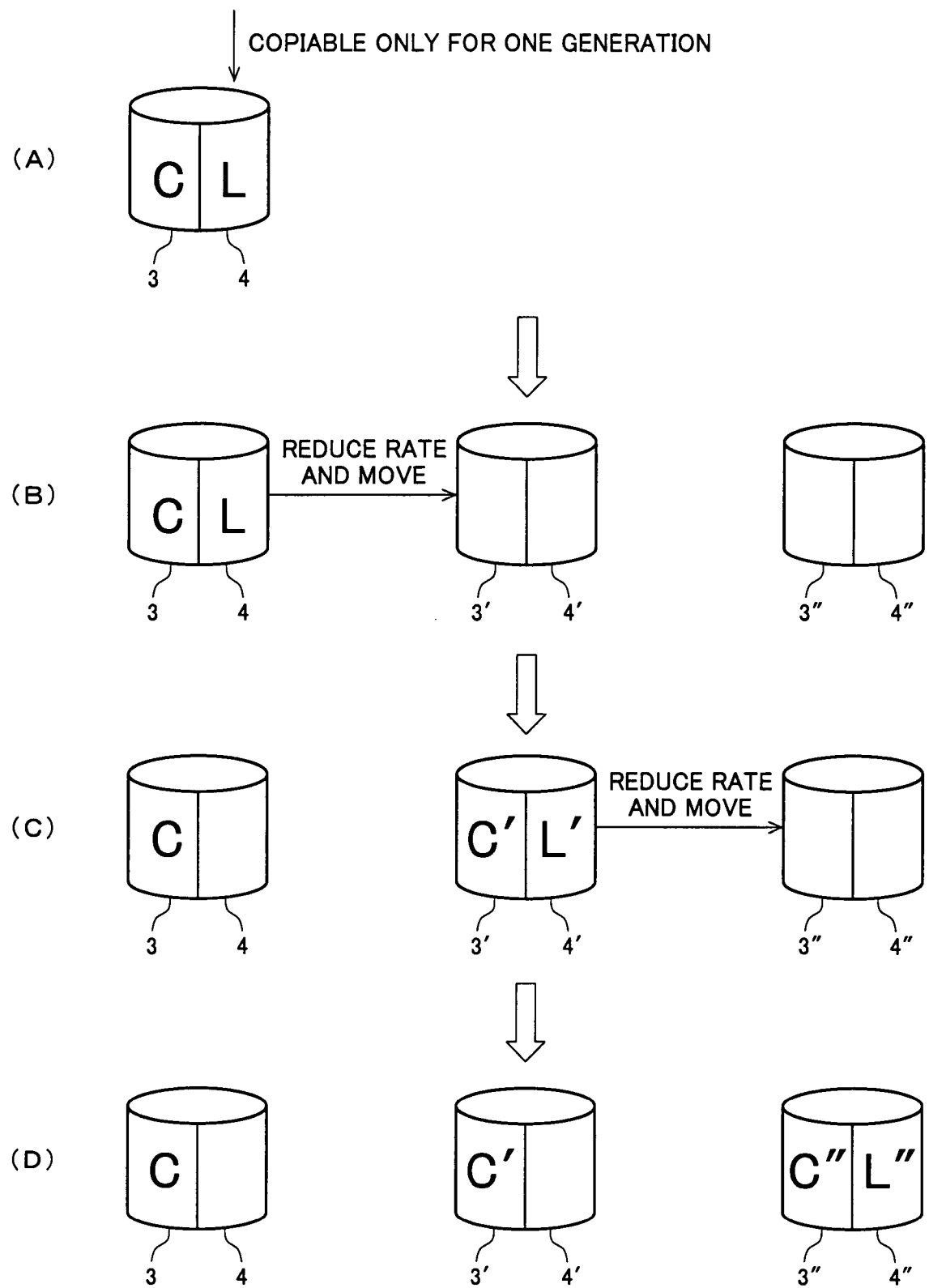
FIG. 11 is a diagram for explaining an example of a flow of the video/audio signal and license in another embodiment of the present invention.

FIG. 11 is a diagram for explaining an example of a flow of the video/audio signal and license in another embodiment of the present invention. In this embodiment, a third recording medium including a normal area 3" and a secure area 4" is provided in addition to the recording medium including the normal area 3 and the secure area 4 and the second recording medium including the normal area 3' and the secure area 4'.

In FIG. 11(A), a video/audio signal copiable only for one generation is recorded on the recording medium. The license L corresponding to the video/audio signal C is recorded on the recording medium. In FIG. 11(B), the video/audio signal is converted and copied to the second recording medium and the license is moved. "Reduce rate and move" of FIG. 11(B) practically indicates the copying of the video/audio signal after the conversion and the move of the license. The video/audio signal C' and the license L' are recorded on the second recording medium. The license L is erased from the original recording medium. In FIG. 11(C), the video/audio signal is converted and copied to the third recording medium and the license is moved. "Reduce rate and move" of FIG. 11(C) also practically indicates the copying of the video/audio signal after the conversion and the move of the license. In FIG. 11(D), the video/audio signal C" and the license L" are recorded on the third recording medium. The license L' is erased from the second recording medium. The same applies to the case of four or more recording mediums.

Figure 12:
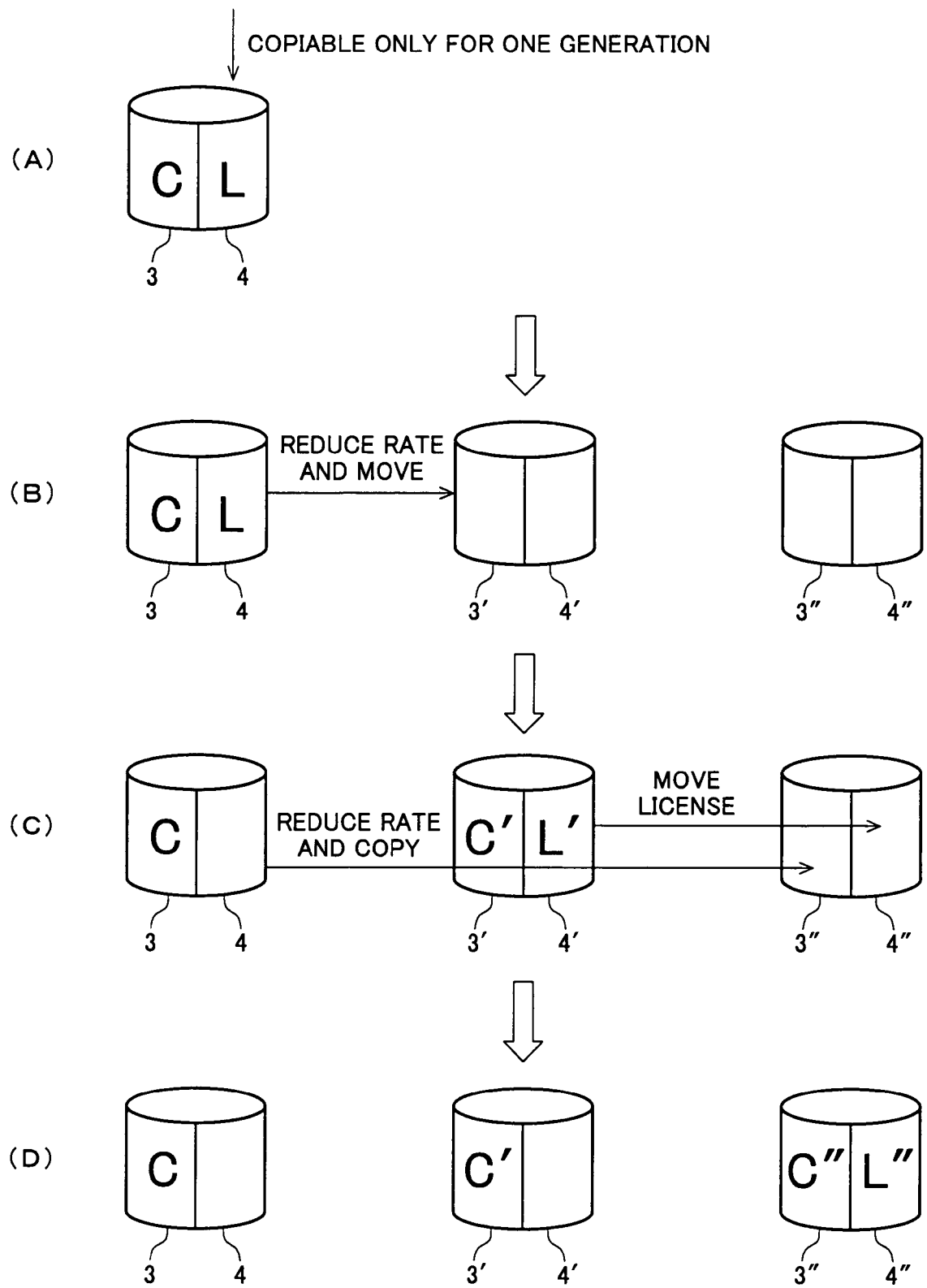
FIG. 12 is a diagram for explaining another example of a flow of the video/audio signal and license in another embodiment of the present invention.
Figure 13:
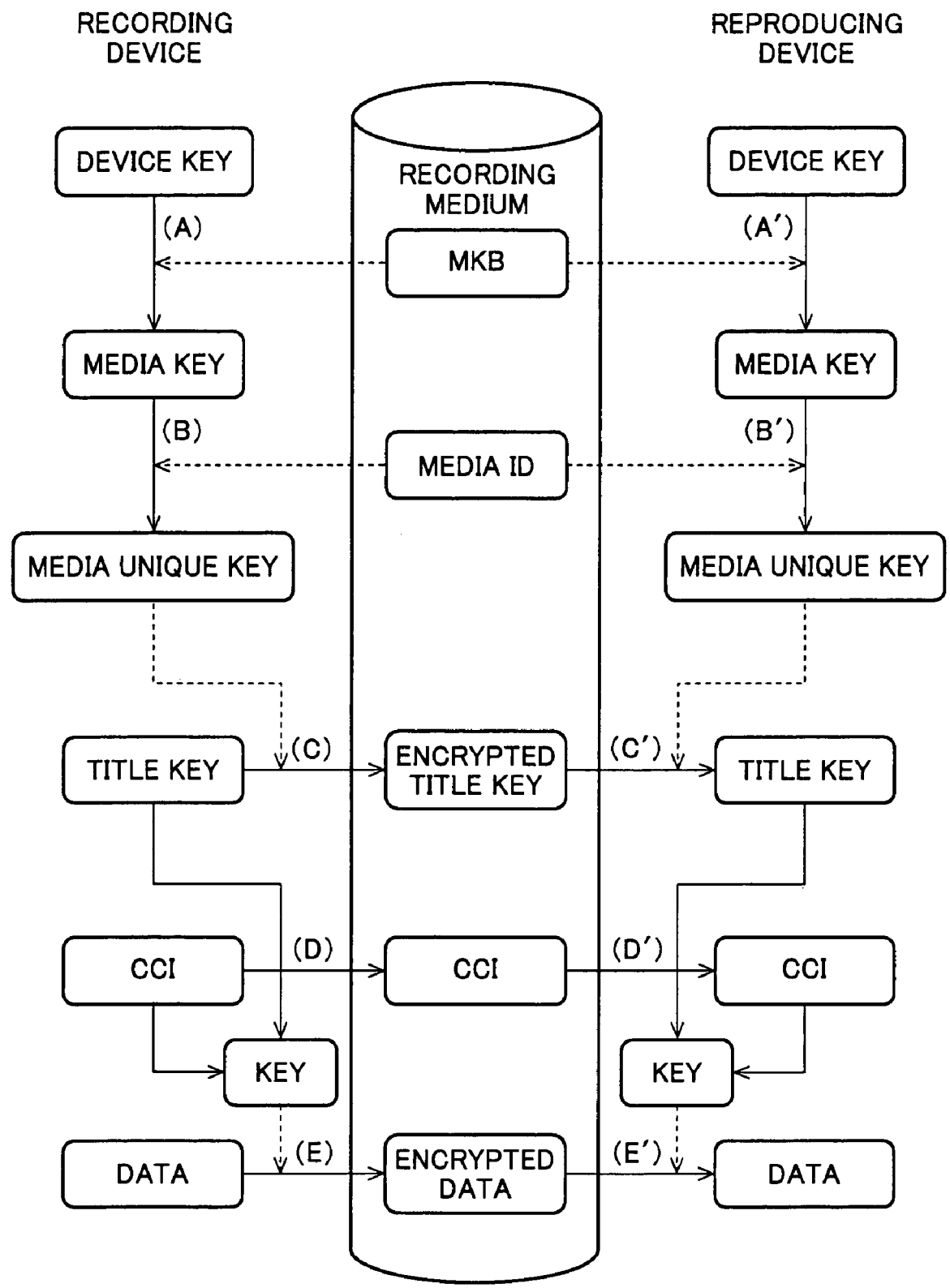
FIG. 13 is a diagram for explaining a technology relating to conventional copyright protection of digital data.
Figure 14:
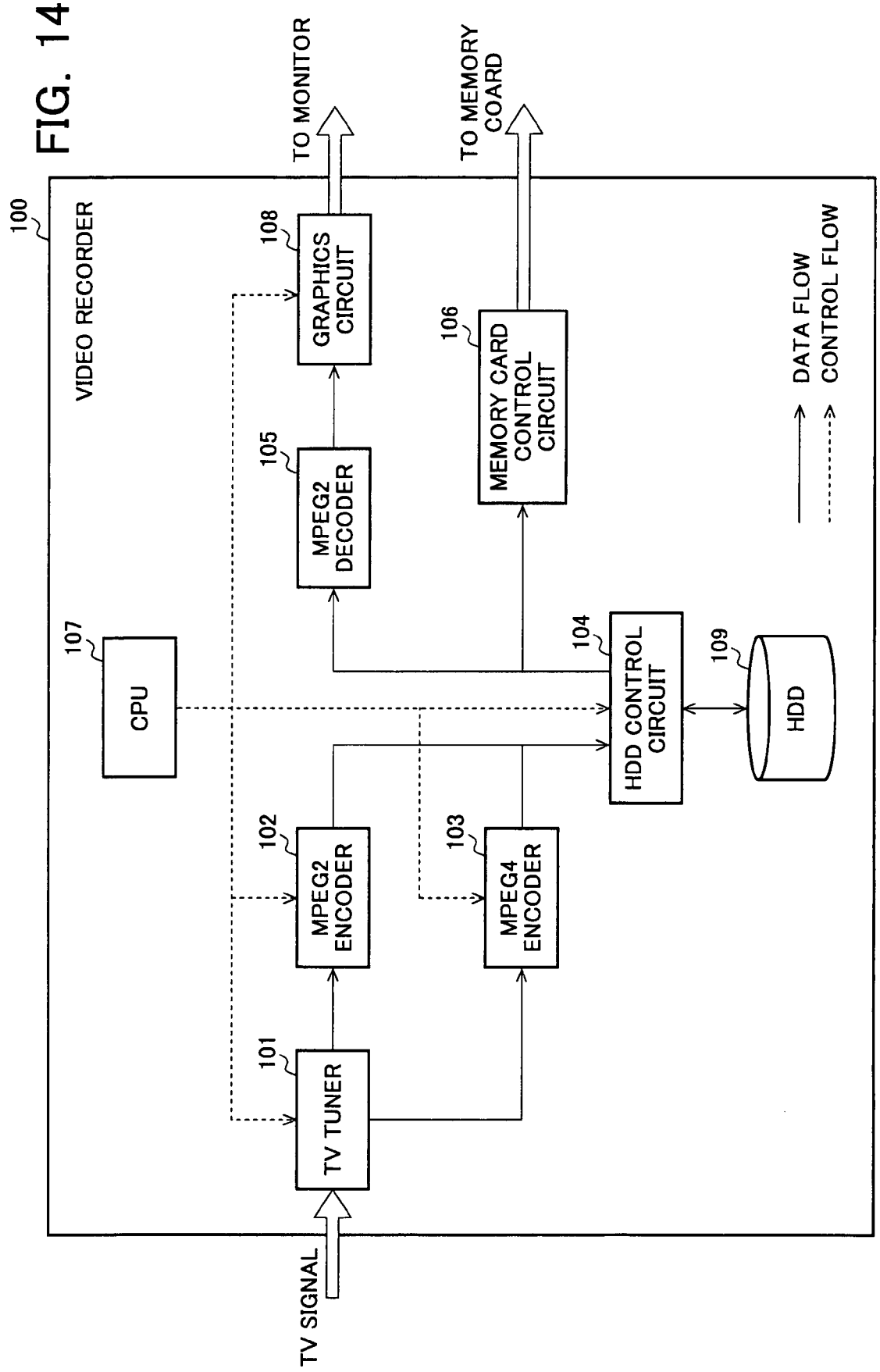
FIG. 14 is a block diagram of a configuration example of a conventional video recorder.
Figure 15:
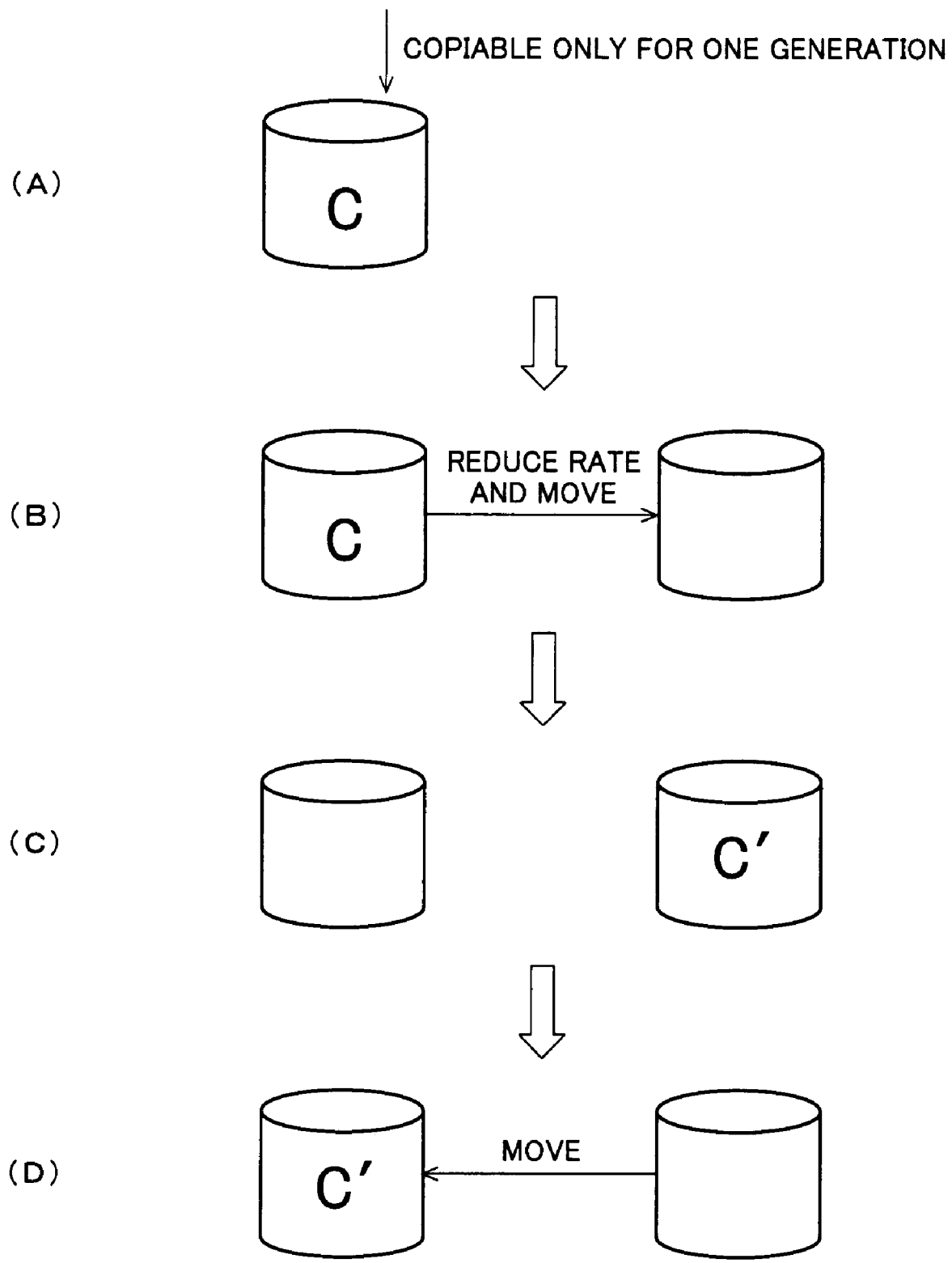
FIG. 15 is a diagram for explaining a process flow when a conventional recording device moves data to another recording device.

FIG. 12 is a diagram for explaining another example of a flow of the video/audio signal and license in another embodiment of the present invention and is a variation of the example shown in FIG. 11. In FIG. 12(A), a video/audio signal copiable only for one generation is recorded on the recording medium. The license L corresponding to the video/audio signal C is recorded on the recording medium. In FIG. 12(B), the video/audio signal is converted and copied to the second recording medium and the license is moved. "Reduce rate and move" of FIG. 12(B) practically indicates the copying of the video/audio signal after the conversion and the move of the license. The video/audio signal C' and the license L' are recorded on the second recording medium. The license L is erased from the original recording medium. Although the video/audio signal is converted and copied to the third recording medium and the license is moved in FIG. 12(C), the license L' is moved from the second recording medium and the video/audio signal C is copied from the original recording medium in this case.

This method is usable when the bit rate of the recording to the third recording medium is greater than that of the recording to the second recording medium. When the video/audio signal C" is created from the video/audio signal C, the video/audio signal C" may be created after the license L' is moved to the original recording medium or may be created without returning the license L' if only the bit rate can be changed in the encrypted state without the license in such a case that the video/audio signal C is hierarchically encoded. In FIG. 12(D), the video/audio signal C" and the license L" are recorded on the third recording medium in this way.

The invention claimed is:

1. A recording device comprising:
an input portion that inputs a video/audio signal;
a controller;
an encrypting portion responsive to the controller to encrypt the video/audio signal from the input portion to provide an encrypted video/audio signal;
a recording portion responsive to the controller to record the encrypted video/audio signal received from the encrypting portion in a first area of a storage device that can be written to or read from without special procedures and information necessary for utilizing the recorded encrypted video/audio signal in a secure area of the storage device separate from the first area and requiring a special procedure to write information to and to read information from the secure area; and
a converting portion that converts at least one of a bit rate or data format of the video/audio signal under control by the controller, wherein:
the controller controls the recording portion to copy the video/audio signal recorded in the first area to an exterior storage location outside of the recording device while further controlling the converting portion to convert the at least one of the bit rate or the data format of the video/audio signal being copied,
the controller further controlling the recorder portion to move the information necessary for utilizing the video/audio signal from the secure area to the exterior storage location such that the moved information necessary for utilizing the video/audio signal is no longer present in the secure area after being moved to the exterior storage location, and
the information necessary for utilizing the encrypted video/audio signal recorded in the secure area of the storage device is license information that includes information necessary for decrypting the encrypted video/audio signal and usage control information relating to the video/audio signal, and is recorded in a predetermined secure area of the exterior storage location.

2. A recording device comprising:
an input portion that inputs a video/audio signal;
a controller;
an encrypting portion responsive to the controller to encrypt the video/audio signal from the input portion;
a recording portion responsive to the controller to record the encrypted video/audio signal in a first area of a storage device that can be written to or read from without special procedures and information necessary for utilizing the recorded encrypted video/audio signal in a secure area of the storage device separate from the first area and requiring a special procedure to write information to and to read information from the secure area; and a converting portion responsive to the controller to convert at least one of a bit rate or data format of the video/audio signal; and the controller further controlling the recording portion to record the converted video/audio signal received from the converting portion in the first area along with the unconverted video/audio signal that existed before the conversion by the converting portion, wherein:

the controller controls the recording portion to copy the converted video/audio signal recorded in the first area to an exterior storage location outside of the recording device, the controller further controlling the recorder portion to move the information necessary for utilizing the converted video/audio signal from the secure area to the exterior storage location such that the moved information necessary for utilizing the converted video/audio signal is no longer present in the secure area after being moved to the exterior storage location, and the information necessary for utilizing the encrypted video/audio signal recorded in the secure area of the storage device includes at least one of an encrypted decryption key generated by encrypting a decryption key of the encrypted video/audio signal and usage control information relating to the video/audio signal and is recorded in the secure area of the storage device or is moved to the exterior storage location.

3. The recording device of claim 1 or 2, wherein the input portion includes a portion for receiving transmission data with a copy control signal overlapped.

4. The recording device of claim 1 or 2, wherein the input portion includes a portion for detachably mounting a recording medium that records a video/audio signal and information necessary for utilizing the video/audio signal to perform read/write from/into the recording medium.

5. A recording device comprising:
an input portion that inputs a video/audio signal;
a controller
a recording portion responsive to the controller to record a video/audio signal in a first area of a storage device that can be written to or read from without special procedures and information necessary for utilizing the recorded video/audio signal in a secure area of the storage device separate from the first area and requiring a special procedure to write information to and to read information from the secure area;
a converting portion that converts at least one of a bit rate or data format of the video/audio signal under control by the controller; and
an encrypting portion responsive to the controller to encrypt the video/audio signal from the input portion so that the encrypted video/audio signal is then recorded by the recording portion in the first area of a storage device as the recorded video/audio signal, wherein:
the controller controls the recording portion to copy the video/audio signal recorded in the first area to an exterior storage location outside of the recording device while further controlling the converting portion to convert the at least one of the bit rate or the data format of the video/audio signal being copied,
the controller further controlling the recorder portion to move the information necessary for utilizing the video/audio signal from the secure area to the exterior storage location such that the moved information necessary for utilizing the video/audio signal is no longer present in the secure area after being moved to the exterior storage location, and the information necessary for utilizing the video/audio signal recorded in the secure area of the storage device is license information that includes information necessary for decrypting the encrypted video/audio signal and usage control information relating to the video/audio signal, and is recorded in a predetermined secure area of the exterior storage location.

6. A recording device comprising:
an input portion that inputs a video/audio signal;
a controller
a recording portion responsive to the controller to record a video/audio signal in a first area of a storage device that can be written to or read from without special procedures and information necessary for utilizing the recorded video/audio signal in a secure area of the storage device separate from the first area and requiring a special procedure to write information to and to read information from the secure area;
a converting portion that converts at least one of a bit rate or data format of the video/audio signal under control by the controller; and
an encrypting portion responsive to the controller to encrypt the video/audio signal from the input portion so that the encrypted video/audio signal is then recorded by the recording portion in the first area of a storage device as the recorded video/audio signal, wherein:
the controller controls the recording portion to copy the video/audio signal recorded in the first area to an exterior storage location outside of the recording device while further controlling the converting portion to convert the at least one of the bit rate or the data format of the video/audio signal being copied,
the controller further controlling the recorder portion to move the information necessary for utilizing the video/audio signal from the secure area to the exterior storage location such that the moved information necessary for utilizing the video/audio signal is no longer present in the secure area after being moved to the exterior storage location, and
the information necessary for utilizing the video/audio signal recorded in the secure area of the storage device includes at least one of an encrypted decryption key generated by encrypting a decryption key of the encrypted video/audio signal and usage control information relating to the video/audio signal and is recorded in the secure area of the storage device or is moved to the exterior storage location.

7. The recording device of any one of claims 1, 2, 5, and 6, wherein the exterior storage location that is a detachable recording medium and wherein the recording device includes a portion for attaching/detaching the detachable recording medium.

8. The recording device of any one of claims 1, 2, 5, and 6, wherein the recording device and the exterior storage location can record reproduction start position information of the video/audio signal and wherein when copying the video/audio signal to the exterior storage location, the recording device also copies the reproduction start position information.

9. The recording device of any one of claims 1, 2, 5, and 6, wherein the recording portion can record a conversion condition at the time of copying to the exterior storage location.

10. A recording method of recording a video/audio signal from a first recording device to a second recording device exterior of the first recording device, the method comprising the steps of:

inputting a video/audio signal to an input of the first recording device;
encrypting the inputted video/audio signal
recording the encrypted video/audio signal in a first area of a first storage device included in the first recording device that can be written to or read from without special procedures;
recording information necessary for utilizing the recorded video/audio signal in a secure area of the first storage device requiring a special procedure to write information to and to read information from the secure area;
converting at least one of a bit rate or data format of the recorded video/audio signal while copying the recorded video/audio signal from the non-secure area to a second storage device in the second recording device; and
moving the information necessary for utilizing the video/audio signal from the secure area to a predetermined secure area in the second storage device in the second recording device such that the moved information necessary for utilizing the video/audio signal is no longer present in the secure area of the first storage device, wherein
the information necessary for utilizing the video/audio signal is license information that includes information necessary for decrypting the encrypted video/audio signal and usage control information relating to the video/audio signal and is recorded in a predetermined secure area of the exterior storage location.

11. A recording method of recording a video/audio signal from a first recording device to a second recording device exterior of the first recording device, the method comprising the steps of:
inputting a video/audio signal to an input of the first recording device;
encrypting the inputted video/audio signal
recording the encrypted video/audio signal in a first area of a first storage device included in the first recording device that can be written to or read from without special procedures;
recording information necessary for utilizing the recorded video/audio signal in a secure area of the first storage device requiring a special procedure to write information to and to read information from the secure area;
converting at least one of a bit rate or data format of the input video/audio signal;
recording the converted video/audio signal in the first area along with the input video/audio signal;
copying the converted video/audio signal from the first area to a second storage device in the second recording device; and
moving the information necessary for utilizing the video/audio signal from the secure area to a predetermined secure area in the second storage device in the second recording device such that the moved information necessary for utilizing the video/audio signal is no longer present in the secure area of the first storage device, wherein
the information necessary for utilizing the video/audio signal recorded in the secure area of the storage device includes at least one of an encrypted decryption key generated by encrypting a decryption key of the encrypted video/audio signal and usage control information relating to the video/audio signal and is recorded in the secure area of the storage device or is moved to the exterior storage location.

12. The recording device of claim 5 or 6, wherein the input portion includes a portion for receiving transmission data with a copy control signal overlapped.

13. The recording device of claim 5 or 6, wherein the input portion includes a portion for detachably mounting a recording medium that records a video/audio signal.

14. A recording method of recording a video/audio signal from a first recording device to a second recording device exterior of the first recording device, the method comprising the steps of:
inputting a video/audio signal to an input of the first recording device;
encrypting the inputted video/audio signal
recording the encrypted video/audio signal in a first area of a first storage device included in the first recording device that can be written to or read from without special procedures;
recording information necessary for utilizing the recorded video/audio signal in a secure area of the first storage device requiring a special procedure to write information to and to read information from the secure area;
converting at least one of a bit rate or data format of the recorded video/audio signal while copying the recorded video/audio signal from the non-secure area to a second storage device in the second recording device; and
moving the information necessary for utilizing the video/audio signal from the secure area to a predetermined secure area in the second storage device in the second recording device such that the moved information necessary for utilizing the video/audio signal is no longer present in the secure area of the first storage device, wherein
the information necessary for utilizing the video/audio signal recorded in the secure area of the storage device includes at least one of an encrypted decryption key generated by encrypting a decryption key of the encrypted video/audio signal and usage control information relating to the video/audio signal and is recorded in the secure area of the storage device or is moved to the exterior storage location.

15. A recording method of recording a video/audio signal from a first recording device to a second recording device exterior of the first recording device, the method comprising the steps of:
inputting a video/audio signal to an input of the first recording device;
encrypting the inputted video/audio signal
recording the encrypted video/audio signal in a first area of a first storage device included in the first recording device that can be written to or read from without special procedures;
recording information necessary for utilizing the recorded video/audio signal in a secure area of the first storage device requiring a special procedure to write information to and to read information from the secure area;
converting at least one of a bit rate or data format of the input video/audio signal;
recording the converted video/audio signal in the first area along with the input video/audio signal;
copying the converted video/audio signal from the first area to a second storage device in the second recording device; and
moving the information necessary for utilizing the video/audio signal from the secure area to a predetermined secure area in the second storage device in the second recording device such that the moved information necessary for utilizing the video/audio signal is no longer present in the secure area of the first storage device, wherein the information necessary for utilizing the encrypted video/audio signal recorded in the secure area of the storage device is license information that includes information necessary for decrypting the encrypted video/audio signal and usage control information relating to the video/audio signal, and is recorded in a predetermined secure area of the exterior storage location.

* * * * *